(12) United States Patent
Voll

(10) Patent No.: US 6,755,967 B2
(45) Date of Patent: Jun. 29, 2004

(54) WELL WATER FILTRATION APPARATUS AND SYSTEM

(76) Inventor: Mark Voll, 9556 Cotharin Rd., Malibu, CA (US) 90265

( * ) Notice: Subject to any disclaimer, the term of this patent is extended or adjusted under 35 U.S.C. 154(b) by 275 days.

(21) Appl. No.: 10/005,836

(22) Filed: Nov. 8, 2001

(65) Prior Publication Data

US 2002/0053549 A1 May 9, 2002

Related U.S. Application Data

(60) Provisional application No. 60/247,154, filed on Nov. 8, 2000.

(51) Int. Cl.[7] .............................................. B01D 21/26
(52) U.S. Cl. ...................... 210/167; 210/170; 210/196; 210/416.3; 210/512.1
(58) Field of Search ................................. 210/167, 170, 210/136, 196, 199, 416.1, 416.3, 512.1, 512.2, 512.3

(56) References Cited

U.S. PATENT DOCUMENTS

| | | | |
|---|---|---|---|
| 3,345,516 A | 10/1967 | Cedrone | 73/61 |
| 3,638,833 A * | 2/1972 | Lucas | 222/57 |
| 3,698,555 A | 10/1972 | Conner | 210/138 |
| 3,956,128 A * | 5/1976 | Turner | 210/150 |
| 3,959,139 A | 5/1976 | El-Hindi | 210/97 |
| 4,048,067 A | 9/1977 | Cheng | 210/73 |
| 4,146,468 A | 3/1979 | Wilson | 209/211 |
| 4,170,555 A | 10/1979 | Vicard | 210/74 |
| 4,878,924 A | 11/1989 | Yamo et al. | 55/204 |
| 4,909,950 A | 3/1990 | Katoh et al. | 210/788 |
| 5,028,321 A | 7/1991 | Stone et al. | 210/167 |
| 5,112,479 A | 5/1992 | Srimongkolkul | 210/149 |
| 5,180,486 A | 1/1993 | Smolensky | 210/195 |
| 5,227,061 A | 7/1993 | Bedsole | 210/304 |
| 5,368,735 A | 11/1994 | Ford | 210/512 |
| 5,395,537 A | 3/1995 | Ellison | 210/787 |
| 5,411,084 A | 5/1995 | Padden | 166/230 |
| 5,451,318 A | 9/1995 | Moorehead | 210/512 |
| 5,478,484 A | 12/1995 | Michaluk | 210/788 |
| 5,635,068 A | 6/1997 | Marandi | 210/721 |
| 5,676,840 A | 10/1997 | Paul | 210/695 |
| 5,866,018 A | 2/1999 | Hyde et al. | 210/787 |
| 6,149,825 A * | 11/2000 | Gargas | 210/788 |
| 6,238,556 B1 * | 5/2001 | Hawk et al. | 210/169 |

\* cited by examiner

Primary Examiner—Robert James Popovics
(74) Attorney, Agent, or Firm—Cislo & Thomas LLP

(57) ABSTRACT

A system for filtering well water residing in a water storage tank or reservoir in which water laden with sediment and debris is removed by a pump from the center of the bottom of the tank, passed through one or more sand filters, and returned to the tank. The suction caused by the pumping action creates a vortex in the water in the storage tank which promotes the collection and accumulation of sediment and debris in the center of the bottom of the tank. The tangential injection of the return water aids in the creation of the vortex or swirling motion around central axis of rotation which in turn causes particulate matter, dirt, and debris to gravitate to the bottom of the tank and collect in the center of the tank's floor, which is skimmed by either the same or a separate stand-alone pumping action. The degree of separation of the particulate matter from the well water is substantial with a large majority of the particulate matter accumulating near the center of the bottom of the tank. This process is repeated periodically, and the resultant purity of the well water quickly becomes much higher than any competing filtration systems. The system also requires only minimal retrofitting of existing tanks, and may contain one or more spa-type aerators to introduce air bubbles into the tank water for the prevention of algae buildup, and the removal of carbon dioxide and sulfuric compounds from the mater mixture.

5 Claims, 3 Drawing Sheets

WELL WATER FILTRATION APPARATUS AND SYSTEM

CROSS-REFERENCE TO RELATED APPLICATIONS

Pursuant to 35 U.S.C. § 119(e), this application claims the benefit of U.S. Provisional Patent Application No. 60/247,154 filed on Nov. 8, 2000.

BACKGROUND OF THE INVENTION

This invention relates generally to well water filtration systems, and more particularly to well water filtration systems in which the well water that is resident in a tank or reservoir is itself periodically removed from the tank or reservoir, filtered, and returned to the tank or reservoir.

A number of purification and filtration systems have been developed for the market over the years in an attempt to filter and purify well water, such as ozone systems, chlorination systems, reverse osmosis systems, in-line filter systems, and many others. The costs of installation and maintenance of these systems are substantial. Moreover, these systems are wasteful, typically wasting roughly half of the well water in order to clean the other half. Some of these systems simply do not work at all.

The vast majority of the presently available well water filtration systems attempt to filter the well water as it is drawn from the water table and passed through an in-line filter on its way to a well water storage tank or reservoir. Other filtration systems attempt to filter the water in a similar in-line fashion as the well water exits the storage tank for its end use. These systems are inadequate and vastly inferior to the filtration systems of the present invention. First, such in-line filtration systems ordinarily pass the well water through the filter or filters only once. Second, these in-line filtration systems filter the water at the wrong time, either causing the holding tank to fill slowly, or worse, preventing the fast supply of well waters to the end use. What is needed is an efficient well water filtration system that filters the well water as it is being held in the tank or reservoir, in those long periods between the time the water is drawn from the well and the time the water is delivered to its end uses.

BRIEF SUMMARY OF THE INVENTION

This present invention involves a well water filtration system in which a portion of the water laden with sediment and debris residing in a water storage tank or reservoir is periodically removed by a pump from the center of the bottom of the tank, passed through one or more sand filters, and returned to the tank. The technique developed in the present invention is to cause a strong suction near the bottom-center of the tank or reservoir causing the resident water to rotate around a generally central axis of rotation within the tank.

This rotary motion, whether slow or a fast vortex, causes particulate matter, debris, sediment, and contaminants to break free from suspension within or on top of the well water and gravitate to the bottom of the tank. The rotary motion also causes the sediment and contaminants once at the bottom of the tank to move toward the center of the bottom of the tank and accumulate in substantially higher concentration than elsewhere in the tank. Either the same vortex suction line or a second suction line, or both, are fit with one or more collector orifices at or near the center of the bottom of the tank to collect the accumulating sediment and debris and direct this debris-laden water to one or more filters where the sediment and debris is filtered out.

The filtered water is then returned to the well water tank through one or more return jets. The jets may be angled so as to return the filtered water in the direction of the rotation of the water or may be angled so as to direct the filtered water to noticeable 'dead' spots within the tank. That is, in uneven tanks or reservoirs, once the well water is nearly all filtered, dead spots may be noticeable from the top of the tank through the otherwise clear well water. The return jets can then be used somewhat like a water pick at those dead spots. In evenly cylindrical tanks, the return jets may direct the filtered water in the direction of the rotation of the well water caused by the suction line, thereby aiding in the development of the rotation of all of the water in the tank. Alternatively, the return jets may be angled to return the filtered water in the opposite direction in order to cause additional agitation of the well water to further release the sediment and contaminants from suspension in the well water.

Additionally, the return jets may be equipped with an aerator for the introduction of air bubbles into the well water tank. The benefits of aerators in the case of spas are lauded by many as including killing resident algae, preventing future algae buildup, and removing carbon dioxide and sulfate compounds, among other benefits. The inventor has determined that the aerators also assist in removing iron from solution. As a result, the iron drops out of suspension and accumulates with the other contaminants. This filtration process may be initiated manually or automatically by incorporating an adequate time clock and timer switch.

The filtration system of the present invention can readily be fit to an existing tank or can be part of a new tank. The only alteration required for an existing tank is the insertion of the one or more suction lines and the one or more return lines through an intake port in the top of side of the tank. From time to time, the well water tank is removed from the pump line and the filters are run in reverse in order to clear out the particulate matter that has built up in the filter. This backwash phase of the filtration system may be accomplished manually or by automatic timer.

An object of the present invention is to provide for efficient and thorough methods for cleaning and filtering well water for industrial, agricultural, and residential use, filtering the well water while the water is resident in the well water tank.

Another object is to provide a filtration system that obtains much higher purification of the well water than other filtration systems presently available. A further object is to provide a filtration system that can deal with particularly dirt-laden well water. Another object is to provide such a system in a portable package, as well as a filtration system that may be easily retrofit to existing tanks needing very little alterations to the existing tank.

A further object of the present invention is to provide a well water filtration system that creates a swirling motion or vortex in the water in the retaining tank so that particulate matter is freed from suspension and gathers in the center at the bottom of the tank where, from time to time, the sediment-laden water in the center-bottom of the tank is pumped away and collected in a filter, and the filtered water is returned to the retaining tank.

A further object of the present invention is to provide a filtration system that incorporates one or more aerators that further promote the removal of algae and other contaminants from the well water.

Other aspects and advantages of the present invention will become readily apparent to those ordinarily skilled in the art

DETAILED DESCRIPTION OF THE PREFERRED EMBODIMENTS

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1:
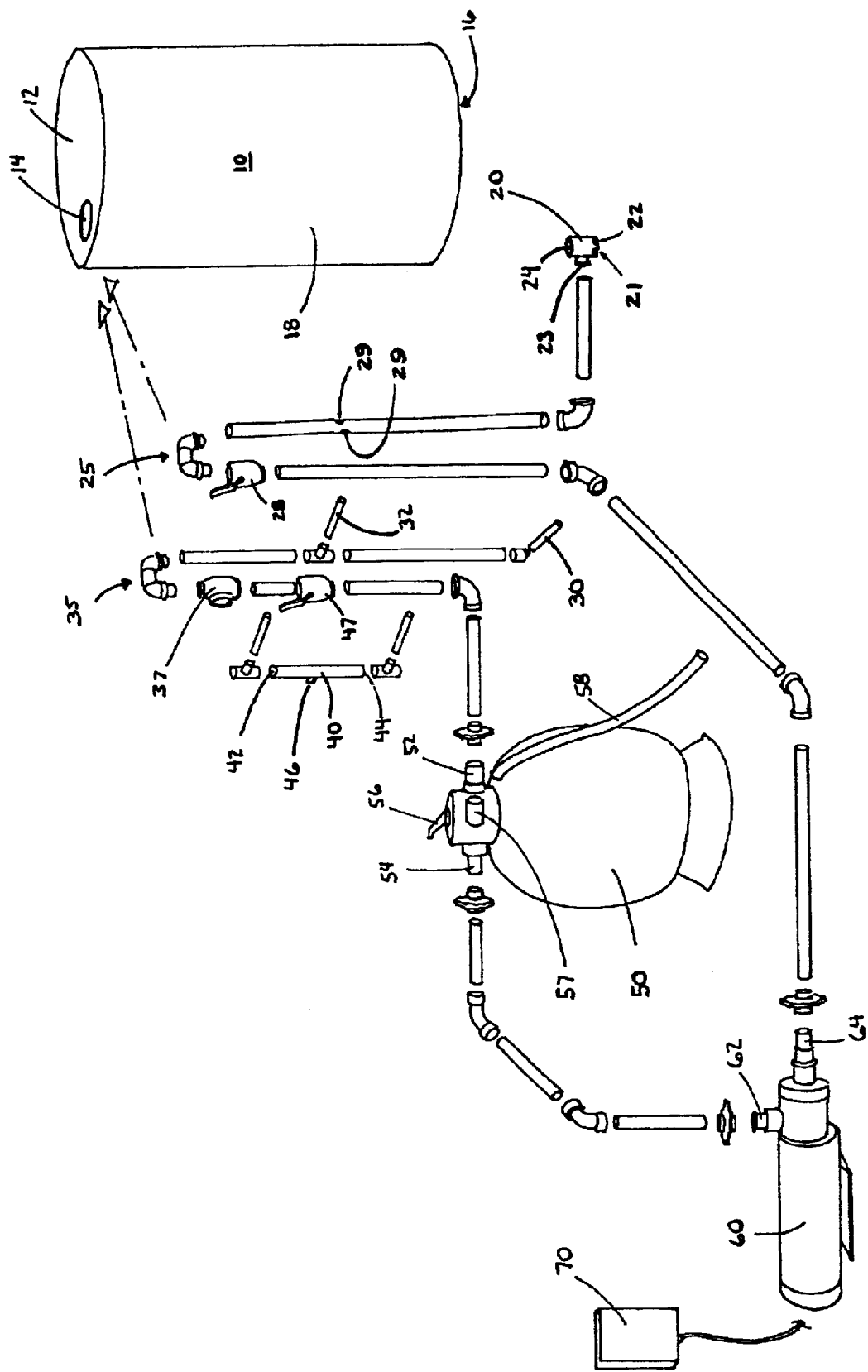
FIG. 1 is an exploded perspective view of one embodiment of the present invention having a tee-section suction fitting.
Figure 2:
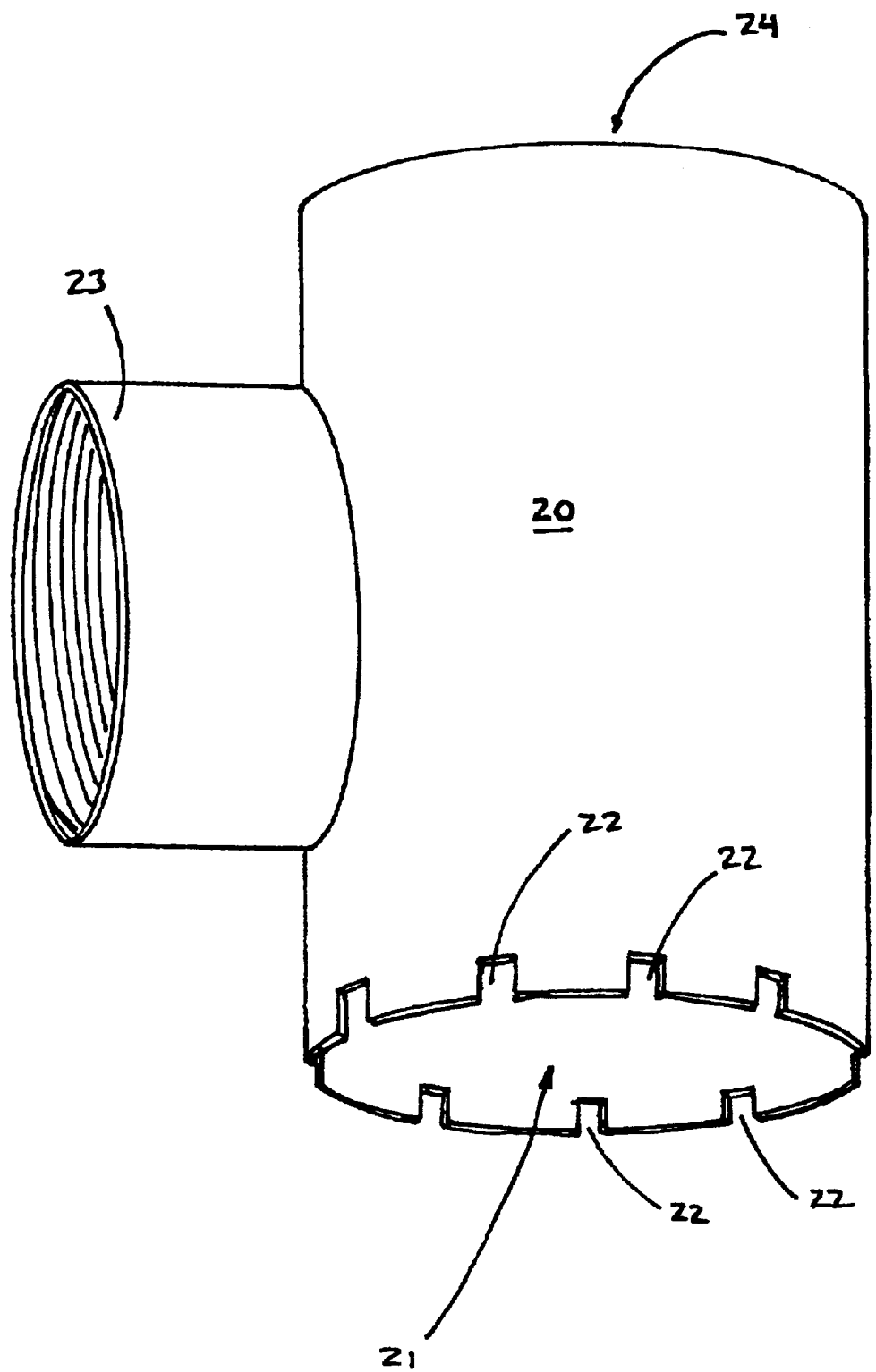
FIG. 2 is a perspective view of a tee-section suction fitting in accordance with one embodiment of the present invention.

Referring now to FIG. 1, the embodiments of the present invention may involve an already existing tank or reservoir 10 or one specially manufactured for use in the filtration system described below. The filtration system is designed to be easily retrofit to old existing tanks or reservoirs, whether cylindrical, square, or asymmetrical, and whether metal, plastic, or concrete. The filtration system uses either an existing top or side intake port 14 or requires the creation of a simple hole in the top 12 or side 18 surface of the tank 10. The hole needs to be only large enough to slide the suction lines 25 and return lines 35 into the tank 10 as described below. These lines preferably involve 2-inch PVC piping, and therefore the intake port 14 ordinarily needs only to be about 5 or 6 inches in diameter. There are different fittings that may be used on the suction and return lines, however, which may require a larger intake port 14, as described below. Alternatively, the intake port 14 may be instead two or more separate ports, one for each separate line.

Figure 3:
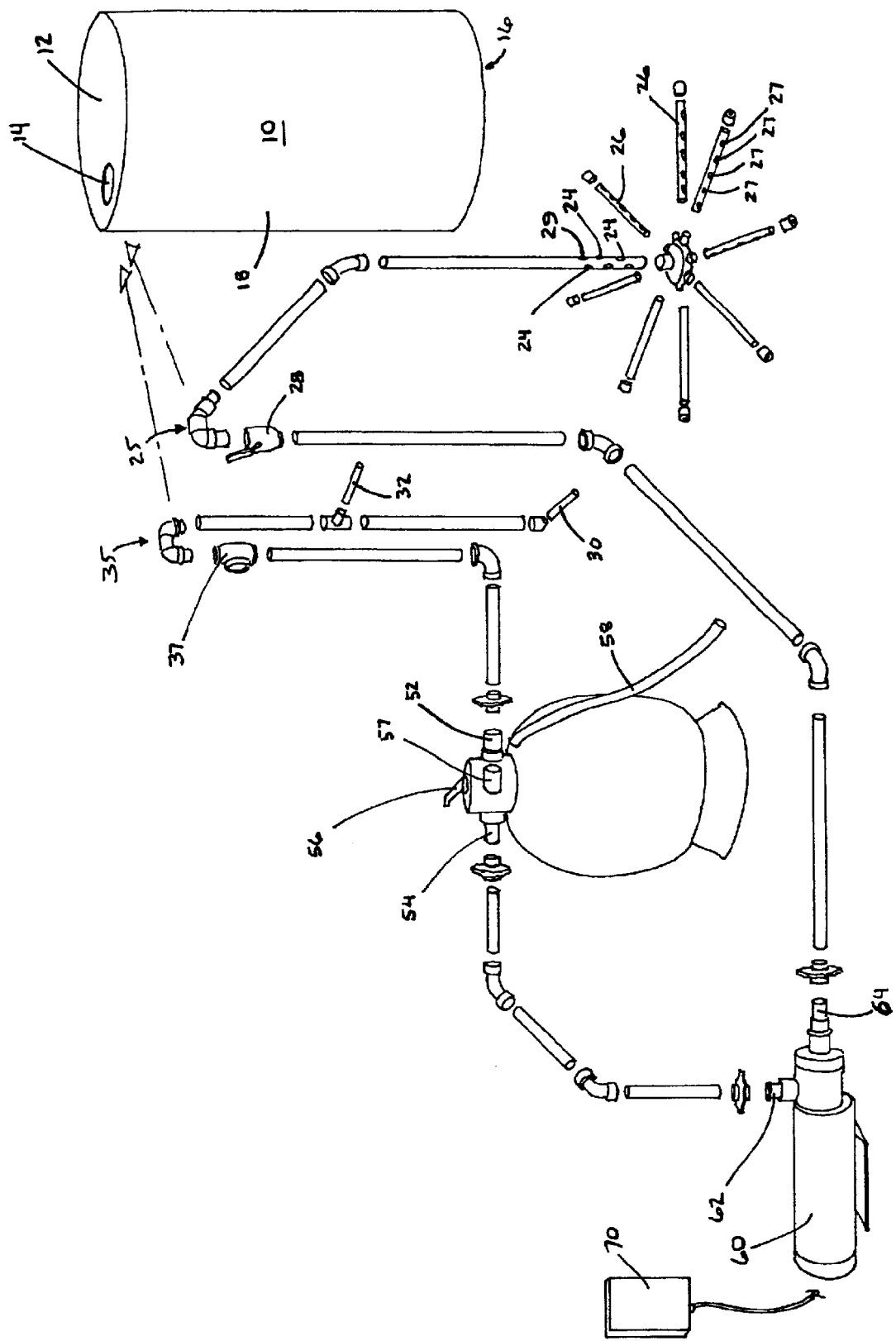
FIG. 3 is an exploded perspective view of another embodiment of the present invention having a suction fitting with several radially extending arm sections.

A suction fitting 20 is connected to one end of the suction line 25 through connector port 23. As shown in FIG. 3, the suction fitting 20 may be a series of vortex intake orifices 24 and a series of radially extending arms 26 each having a plurality of collection orifices 27. The suction fitting 20 may alternatively be a tee-section piping with a vortex orifice 24 and a collector end 21, as shown in FIG. 1. The collector end 21 is equipped with one or more collector orifices or grooves 22. Collector orifices 22 may be round, rectangular, or any other shape and are preferably ¼-inch to ½ inch in width or diameter.

The suction fitting 20 is preferably located near the center of the bottom of the tank with vortex orifice 24 facing upward and collector end 21 is facing downward and resting on or near the bottom surface 16 of tank 10. Where the suction fitting includes a series of radially extending arms 26 are employed, it is preferable that they are placed very near bottom surface 16 of tank 10 with the inlets 27 facing downward or in the direction of the anticipated flow of the water as further described below thereby aiding in the development of flow in the tank 10 as well as being optimally positioned to receiving the on-coming sediment and debris. The vortex orifice 24 is large enough to cause the water in the retaining tank 10 to rotate. The collector orifices 22 or 27 are just large enough to skim the sediment-laden water that accumulates near the center of the bottom of the tank 10 due to the rotating motion of the water in the tank 10 so that the aggregate cross-sectional area of the vortex orifices 24 is substantially larger than the aggregate cross-sectional area of the collector orifices 22 or 27.

Whether suction fitting 20 employs a tee-section or a series of radially extending arms, there are one or more vortex orifices 24 and one or more collector orifices 22 or 27. The interplay between these two suction orifices cause the very effective and efficient collection of the sediment and debris in the well water for filtration. The vortex orifices 24 are responsible for a vast majority of the well water that is pumped through the filtration system; whereas the collector orifices 22 or 27 are responsible for a relatively small portion of the well water that is pumped through the filtration system. The relatively large amount of flow caused by vortex orifices 24 cause the rotation or vortex in the well water as it resides in the tank 10. The collector orifices 22 or 27 suck in the sediment and particulate matter that have accumulated at the center of the bottom of the tank 10 due in large part to the rotation of the well water.

The suction line 25 may further be equipped with one or more anti-siphoning holes 29 positioned to indicate when the water level is below the required level established by local fire codes or when the water is otherwise below a safe level for proper functioning of the filter system. For example, if the return line 35 bursts or if the filter backwash switch 56 is switched to the wrong position, the filtered water may not properly return to tank 10. If this process is erroneously continued for some time, the water level in the tank 10 would drop below the anti-siphoning hole would begin to take on air rather than water and would circumvent the further removal of water and debris by the suction fitting 20. The vortex openings 24 of the suction fitting 20 may itself be utilized as an anti-siphoning holes 29. The suction line 25 may also be provided with a shut off valve 28, such as a standard ball valve to stop the flow of water, air, or sediment from tank 10.

The suction line 25 is connected to a pump 60 and a sand filter 50. There are several pumps on the market that could provide the necessary pumping power for the present invention. It is anticipated that pumping rates of about 100 to 150 gallons per minute provide a typical range with excellent results, but the system has been used successfully at 500 gallons per minute and there is no reason that higher rates will work equally well, including 1500 gallons per minute and higher. One particular pump presently being used by the inventor is an Aquaflo "A" Series all-bronze pump.

The flow rate desired is normally dictated by the size of the tank or reservoir 10. A common 5000 to 10000 gallon tank can be kept clean with the present system with a flow rate of 100 to 120 gallons per minute, whereas a 130,000 gallon tank would benefit from flow rates in the range of 400 to 450 gallons per minute. The above-described Aquaflo pumps easily handle this range, as well as plenty other commercially available water pumps.

A second issue pertaining to these higher rates becomes how many filters 50 to use when the flow rates exceed about 150 gallons per minute. The inventor has found that, while a single filter is adequate for flow rates up to 150 gallons per minute, superior results can be achieved at 450 gallons per minute by employing four filters in series, depending on the particular filters selected. A similar ratio of one filter per 125 gallons per minute can be readily extrapolated to a system in which a flow rate of 1500 or more gallons per minute is desired.

The pump 60 has an ingress port 64 and an egress port 62. The pump 60 may be operated manual when needed or, if automatic pumping is desired, the pump 60 may be equipped with or connected to a time clock and timing circuitry 70.

The filter 50 may be any adequate commercially available filter designed and advertised for use with swimming pools, such as Tagelus™ fiberglass sand filters from PacFab, Inc. The filter 50 is equipped with an ingress port 54, an egress port 52, a backwash switch 56, and a backwash port 57 and backwash hose 58. The present invention contemplates other brand filters as well.

A return line 35 is provided to return the filtered water to tank 10, and may include a check valve 37 so that return flow may be monitored by the operator. The end of the return line 35 is place inside the tank 10 and equipped with one or more return jets 30 and one or more mid-level return jets 32. The return jets 30 and 32 are preferably positioned near the side walls 18 of the tank 10 and angled tangential to the circumference of the tank so as to aid in the creation and maintenance of the rotation of or vortex in the water in the tank 10. Due to the rotation of the earth, counterclockwise rotation is to be expected in the northern hemisphere such as in the United States and clockwise rotation is to be expected in the southern hemisphere. Angular velocities of the well water ranging anywhere from slow to very fast, creating only a small rotation or a highly developed and visible vortex, have been found to be effective to produce an effective filtration system in accordance with the present invention. The important feature is simply that the well water is agitated in a clockwise or counterclockwise direction at a sufficient angular velocity to break the sediment and contaminants free to gravitate to the bottom of the tank and to accumulate in the center of the bottom of the tank.

Alternatively, the return jets 30 and 32 could be used to disturb and move sediment from recognized dead spots. Such dead spots, if any, will become evident once filtration has occurred for some time. Occasionally, the dead spots occur in the corners of a square retaining tank 10. Additionally, the return jets 30 and 32 could be used as a type of a water pick to aid in dislodging stubborn sediment build up on or stuck to the walls of the tank 10.

Additionally, one or more aerators 40 may be attached to the return line 35, either at the return jets 30 and/or 32 or outside of the tank 10 or anywhere in between. The aerators 40 introduce air bubbles into the flow that exits the return jets 30 and/or 32. The amount of aeration can be varied manually by a diverter valve 47, which is used to divert a small portion of the return water through the aerator. The aerators 40 are available commercially for spas, but the present invention applies for the first time known to the inventor these aerators to well water filtration systems. The aerators 40 are equipped with an ingress port 44 open to the air outside of the tank and an egress port 42 connected to some point along the return line. The air is brought in from the outside through the ingress port 44 of the aerator 40, and the air is introduced through air intake port 46 into the water of the return line 35 as the water passes by the egress port 42 of the aerator 40. Such aerators 40 have been shown to kill existing algae and prevent the development of new algae in swimming pools. They have also been lauded as effective in removing carbon dioxide, as well as sulfides and other spa contaminants.

Although the present invention has been described in detail in reference only to present-preferred embodiments, it will be appreciated by those of ordinary skilled in the art that various modifications can be made without departing from the inventive concept of the present invention. Accordingly, the invention is not limited by specific embodiments shown and described.

What is claimed is:

1. A well water purification system comprising:

a tank for retaining well water, at least one suction line having at least one suction fitting positioned inside the tank near the center of the bottom of the tank and having one or more vortex orifices, means for pumping water through said suction line, means for filtering the water that is pumped through said suction line, and at least one return line connected to said pump having at least one return jet, wherein the suction caused at the one or more vortex orifices is sufficient to cause the well water in the tank to rotate enough to aid in the accumulation of sediment or particulate matter near the center of the bottom of the tank, and wherein the aggregate cross-sectional area of said one or more vortex orifices is substantially larger than the aggregate cross-sectional area of said one or more collector orifices.

2. A well water purification system comprising:

a tank for retaining well water, at least one suction line having at least one suction fitting positioned inside the tank near the center of the bottom of the tank and having one or more vortex orifices, means for pumping water through said suction line, means for filtering the water that is pumped through said suction line, and at least one return line connected to said pump having at least one return jet, wherein the suction caused at the one or more vortex orifices is sufficient to cause the well water in the tank to rotate enough to aid in the accumulation of sediment or particulate matter near the center of the bottom of the tank; and further comprising one or more aerators connected to said at least one return line.

3. A well water purification system comprising:

a tank for retaining well water, a suction line having at least one suction fitting positioned inside the tank near the center of the bottom of the tank and having one or more vortex orifices and having one or more collector orifices at least one pump connected to said suction line, at least one filter in line with said pump, a return line connected to said pump having at least one check valve and at least one return jet, an aerator connected to said return line, and a diverter valve for diverting a portion of the water in said return line through said aerator, wherein the suction caused at the one or more vortex orifices is sufficient to cause the well water in the tank to rotate enough to aid in the accumulation of sediment or particulate matter near the center of the bottom of the tank.

4. A well water purification system according to claim 3 wherein the aggregate cross-sectional area of said one or more vortex orifices is substantially larger than the aggregate cross-sectional area of said one or more collector orifices.

5. A well water purification system according to claim 3 further comprising one or more anti-siphoning orifices in said at least one suction line.

* * * * *